United States Patent [19]

Stephenson et al.

[11] Patent Number: 6,022,402
[45] Date of Patent: Feb. 8, 2000

[54] WAX COMPOSITIONS COMPRISING ALKENYL SUCCINIC ANHYDRIDE-CAPPED POLY (OXYALKYLENATED) COLORANTS

[76] Inventors: Eugene Kyle Stephenson, 311 Golden Carriage Run, Spartanburg, S.C. 29316; Leonard J. Starks, 213 Timberleaf Dr., Duncan, S.C. 29334

[21] Appl. No.: 09/216,121

[22] Filed: Dec. 18, 1998

[51] Int. Cl.⁷ .................. C09D 13/00; C09D 191/06; C10L 5/04; C10L 5/42; C10L 5/44
[52] U.S. Cl. .................. 106/31.1; 106/272; 44/275; 264/275; 264/349
[58] Field of Search ............ 106/31.1, 272; 44/275; 264/275, 349

[56] References Cited

U.S. PATENT DOCUMENTS

| | | | |
|---|---|---|---|
| 3,734,857 | 5/1973 | Moiso et al. | 252/51.5 R |
| 4,167,510 | 9/1979 | Brendle | 260/174 |
| 4,732,570 | 3/1988 | Baumgartner et al. | 8/506 |
| 5,310,887 | 5/1994 | Moore et al. | 534/729 |
| 5,621,022 | 4/1997 | Jaeger et al. | 523/161 |
| 5,938,828 | 8/1999 | Zhao et al. | 106/31.43 |

*Primary Examiner*—David Brunsman
*Attorney, Agent, or Firm*—Terry T. Moyer; William S. Parks

[57] ABSTRACT

This invention relates to wax formulations comprised of specific poly(oxyalkylenated) colorants having alkenyl succinic anhydride (ASA) terminal groups. Preferably the wax formulation is a crayon. Such polymeric ASA-capped colorants provide excellent coloring, decreased migratory properties, and improved balanced burning characteristics over traditional crayon colorants, pigments, and dyestuffs. This invention also concerns methods of making the aforementioned colored crayon formulations as well as other colored wax articles, such as candles.

20 Claims, No Drawings

WAX COMPOSITIONS COMPRISING ALKENYL SUCCINIC ANHYDRIDE-CAPPED POLY (OXYALKYLENATED) COLORANTS

FIELD OF THE INVENTION

This invention relates to wax formulations comprised of specific poly(oxyalkylenated) colorants having alkenyl succinic anhydride (ASA) terminal groups. Preferably the wax formulation forms a crayon composition. Such polymeric ASA-capped colorants provide excellent coloring, decreased migratory properties, and improved washability characteristics over traditional crayon colorants and dyestuffs. This invention also concerns methods of making the aforementioned colored crayon formulations as well as other colored wax articles, such as candles.

BACKGROUND OF THE PRIOR ART

All of the patents cited throughout this specification are hereby entirely incorporated herein.

Historically, pigments have been utilized as coloring material within crayons. Although these types of dyes provide good coloring throughout the wax medium, they are difficult to handle (powder or dust form), easily stain a myriad of substrates (including a colorist's skin), migrate out of hardened wax to discolor its storage wrapper or its handler's skin, and the like. It is therefore highly desirable to find effective alternatives to such poorly performing wax pigments. There exists a need then to produce a colorant which provides effective, thorough, and homogeneous colorations to wax, is easy to handle, will not migrate out of hardened wax, and will not clog a candle wick with solid particles.

It has been found that the utilization of ASA capped polyoxyalkylene colorants provide all of the requisite beneficial properties outlined above which are desirable within wax compositions, particularly within crayons. Such colorants are present in a neat liquid state at 25° C. which thus facilitates handling and substantially eliminates any wick clogging problems. Furthermore, such colorants are extremely stable when dispersed within a hardened wax medium and therefore cannot migrate out of solution.

ASA capped polyoxyalkylene colorants are known as aqueous ink components, as taught within U.S. Pat. No. 5,310,887 to Moore et al., as well as within ink jet ink formulations, as in U.S. Pat. No. 5,621,022 to Jaeger et al. Moore et al. teach the process of making ASA capped colorants, as well as the utilization of such colorants within ink formulations. No disclosure or motivation to incorporate these ASA capped colorants within waxes is present. Jaeger et al. teach the presence of waxes in their ink jet inks, but only as carriers. Such carriers are well known to those of ordinary skill in the art as viscosity modifiers and do not become colored during the inkjet process. Furthermore, the ASA capped colorants will not effectively color waxes without the presence of a diluent surfactant, as discussed below. Therefore these patents neither teach nor fairly suggest the specific colored wax compositions of the present invention.

OBJECTS OF THE INVENTION

It is therefore an object of this invention to provide a non-staining and non-migrating liquid colorant for utilization within a wax composition. A further objective of this invention is to provide a wax composition which is produced through the utilization of a liquid colorant without the need for volatile organic solvents (such as xylene, toluene, and the like). Still another object of the invention is to produce a colored wax composition which will not stain a handler's skin or discolor its storage wrapper.

SUMMARY OF THE INVENTION

The present invention is thus a colored wax composition comprising polyoxyalkylenated ASA-capped colorants. The term wax is intended to encompass any wax or wax-like substance in which unmodified reactive dyes are substantially insoluble. Waxes are generally defined as saturated fatty (high molecular weight) hydrocarbons. As will be well understood and appreciated by one of ordinary skill in this art, the term wax is not limited to compositions comprising saturated fatty (high molecular weight) hydrocarbons as myriad additives, such as plasticizers and the like, and impurities, including naturally produced and occurring impurities, are also present in various proportions within wax compositions, particularly within wax candles and crayons. More specific types of such waxes include mineral waxes, such as paraffin, montan, ozokerite, microcrystalline wax, earth wax, and the like; animal waxes, such as beeswax, waspwax, Chinesewax (insectwax), and the like; vegetable waxes, such as carnauba, sugarcane wax, candelilla, flax wax, and the like; and synthetic waxes, such as Fischer-Tropsch wax, polyethylene wax, and the like. Such waxes generally melt at temperatures ranging from about 50 to about 70° C. For instance, paraffin wax, which is the most prevalent and most versatile type of wax, melts in a range of between about 55 and about 65° C. Other types of waxes (called additive waxes) may be added to candle and/or crayon compositions to produce differing effects (such as color variations, for example) and may alter the melting point of the base wax composition to a certain degree. The particular wax articles encompassed within this invention solid wax implements, such as candles, crayons, ear plugs, and the like.

Accordingly, this invention includes a wax composition comprising a wax; and a colorant defined by Formula (I)

wherein

R is an organic chromophore;

A is a linking moiety in said chromophore selected from the group consisting essentially of N, O, S, $SO_2N$, and $CO_2$;

B is selected from one or more alkyleneoxy constituents containing from 2 to 4 carbon atoms;

n is an integer of from 2 to about 100;

m is 1 when A is O, S, or $CO_2$, and m is 2 when A is N or $SO_2N$;

x is an integer of from 1 to about 5; and $R^1$ is $C(O)R^2$—$CO(O)H$, wherein $R^2$ is from $C_1$ to about $C_{20}$ alkenyl.

The organic chromophore is, more specifically, one or more of the following types of compounds: azo, diazo, disazo, trisazo, diphenylmethane, triphenylmethane, xanthene, nitro, nitroso, acridine, methine, styryl, indamine, thiazole, oxazine, or anthraquinone. Preferably, R is one or more of azo, diazo, triphenylmethane, methine, or thiazole based compounds. Group A is present on group R and is utilized to attach the polyoxyalkylene constituent to the organic chromophore. Nitrogen is the preferred linking moiety. The polyoxyalkylene group is generally, a combination of ethylene oxide and propylene oxide monomers. Preferably propylene oxide is present in the major amount, and most preferably the entire polyoxyalkylene constituent is propylene oxide.

The preferred number of moles of polyoxyalkylene constituent per ester capped chain (n) is from 2 to 15, more preferably from 4 to 10. Also, preferably two such ester capped chains are present on each polymeric colorant compound (x, above, is preferably 2). In actuality, the number of moles (n) per ester-capped chain is an average of the total number present since it is very difficult to control the addition of specific numbers of moles of alkyleneoxy groups. Furthermore, the preferred ASA chain length ($R^2$) is from $C_8$–$C_{18}$; more preferably from $C_{12}$ to $C_{18}$; and most preferably $C_{18}$.

The amount of colorant added depends largely on the intended end use. For example, if the colored wax composition is a crayon, the colorant is generally added in an amount from about 0.01 to about 15% by weight of the total wax composition in order to introduce sufficient colorant not only to color the wax composition, but also to effectuate a proper transfer of the colorant to a writing surface. Preferably, the required amount is from about 0.1 to about 12% by weight; more preferably from about 1 to about 12%; and most preferably from about 5 to about 10.5%. If the wax composition is a candle, as merely an example, the amount of colorant added is generally from about 0.001 to about 35 by weight of the total wax composition; preferably from about 0.01 to about 2%; more preferably from about 0.01 to about 1.0%; and most preferably from about 0.01 to about 0.1%.

The invention also encompasses a method of producing a colored wax article comprising the sequential steps of (a) providing a solution of molten wax;

(b) introducing into said molten wax a colorant defined by Formula (I)

$$R\{A[(B)_nR^1]_m\}_x \qquad (I)$$

wherein

R is an organic chromophore;

A is a linking moiety in said chromophore selected from the group consisting essentially of N, O, S, $SO_2N$, and $CO_2$;

B is selected from one or more alkyleneoxy constituents containing from 2 to 4 carbon atoms;

n is an integer of from 2 to about 100;

m is 1 when A is O, S, or $CO_2$, and m is 2 when A is N or $SO_2N$;

x is an integer of from 1 to about 5; and $R^1$ is $C(O)R^2$—$CO(O)H$, wherein $R^2$ is from $C_1$ to about $C_{20}$ alkenyl, thereby producing a colored wax composition;

(c) pouring said colored wax composition into a mold; and (d) allowing sufficient time for said colored wax composition to cool within said mold.

The preferred article to be manufactured in this inventive process is a crayon; however, as noted above, candles, ear plugs, and the like, may also be produced by this method.

Any other standard wax composition additives, such as fatty acids, resins, preservatives, wax colorants other than the currently utilized ester capped polymeric colorants, pigments, surfactants, and antistatic compounds may be incorporated within the inventive wax composition or utilized within the inventive production method. Of particular interest and necessity is the utilization of a diluent surfactant, for example a substituted or unsubstituted sorbitan monoester, such as sorbitan monooleate (Span® 80, from Imperial Chemical) and/or ethoxylated sorbitan monooleate (such as Tween® 80, also available from Imperial Chemical). Such diluent surfactants provide aid in the incorporation of the ASA capped polymeric polyoxyalkylenated colorants within the target wax compositions by modifying the viscosity of the ASA capped colorant composition to better match that of the wax. In so doing, the ASA capped colorant mixes more easily and readily with the target wax composition thus producing more thorough and even colors throughout the media. As above, the amount of surfactant added will depend primarily on the amount of colorant added and thus is highly dependent on the intended end use of the colored wax composition. In the instances where such a diluent surfactant is utilized, the surfactant is generally present in a range of ratios of colorant to surfactant from about 1:1 to about 10:1. Preferably, this ratio is from about 1.5:1 to about 7.5:1; more preferably, from about 1.75 to about 5:1; and most preferably from about 2:1 to about 4:1.

DESCRIPTION OF THE PREFERRED EMBODIMENT

Without limiting the scope of the invention, the preferred features of the invention are exemplified below.

The preferred esterified colorants are listed below in tabular form and in correlation with Formula (I) listed above (EO is ethyleneoxy and PO is propyleneoxy).

TABLE 1

Preferred Poly(oxyalkylenated) Colorants

| Col.# | R | A | B(with moles) | $R^2$ | n | m | x |
|---|---|---|---|---|---|---|---|
| 1 | Methine | N | 1EO; 7.5PO; 2.5EO | $C_8$ | 11 | 2 | 1 |
| 2 | Methine | N | 1EO; 7.5PO; 2.5EO | $C_{12}$ | 11 | 2 | 1 |
| 3 | Methine | N | 1EO; 7.5PO; 2.5EO | $C_{18}$ | 11 | 2 | 1 |
| 4 | Triphenylmethane | N | 1EO; 6.5PO | $C_8$ | 7.5 | 2 | 2 |
| 5 | Triphenylmethane | N | 1EO; 6.5PO | $C_{12}$ | 7.5 | 2 | 2 |
| 6 | Triphenylmethane | N | 1EO; 6.5PO | $C_{18}$ | 7.5 | 2 | 2 |

Each of these colorants was produced by the methods outlined in U.S. Pat. No. 5,310,887 to Moore et al., discussed, and entirely incorporated within this specification, above.

Introduction of Colorants into Crayon (or Candle) Compositions

This process generally entailed adding the colorant (or blend of colorant and surfactant) to molten wax and stirring (while the solution remained in a molten state) until the wax solution became an homogeneously colored formulation. This liquid wax solution was allowed to cool in a crayon mold (or a candle mold surrounding a wick), whereupon the wax eventually formed a colored solid crayon (or candle). Colorants 2, 4, and 6, above, were cut to an absorptivity of about 5.0 in wax through dilution with a sorbitan monooleate diluent surfactant (such as Span® 80, available from Imperial Chemical) prior to their introduction within the molten wax media. Colorants 1, 3, and 5, above, were added directly to the molten waxes at an absorptivity of about 0.1 without the addition of a diluent surfactant.

EXAMPLE 1

3.1 grams of Colorant 1 of TABLE 1 were introduced into 36.1 grams of molten paraffin wax. After mixing, the liquid wax solution became an homogeneous yellow composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

EXAMPLE 2

3.3 grams of Colorant 1 of TABLE 1 and 1.7 grams of unsubstituted sorbitan monooleate (Span® 80) were introduced into 38.1 grams of molten paraffin wax. After mixing, the liquid wax solution became an homogeneous yellow composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

EXAMPLE 3

3.0 grams of Colorant 2 of TABLE 1 were introduced into 34.4 grams of molten paraffin wax. After mixing, the liquid wax solution became an homogeneous yellow composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

EXAMPLE 4

2.9 grams of Colorant 2 of TABLE 1 and 1.5 grams of Span® 80 were introduced into 33.3 grams of molten paraffin wax. After mixing, the liquid wax solution became an homogeneous yellow composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

EXAMPLE 5

3.4 grams of Colorant 3 of TABLE 1 were introduced into 34.9 grams of molten paraffin wax. After mixing, the liquid wax solution became an homogeneous yellow composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

EXAMPLE 6

3.1 grams of Colorant 1 of TABLE 1 and 1.6 grams of Span® 80 were introduced into 31.7 grams of molten paraffin wax. After mixing, the liquid wax solution became an homogeneous yellow composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

EXAMPLE 7

2.5 grams of Colorant 4 of TABLE 1 were introduced into 33.2 grams of molten paraffin wax. After mixing, the liquid wax solution became an homogeneous blue composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

EXAMPLE 8

2.6 grams of Colorant 4 of TABLE 1 and 1.3 grams of Span® 80 were introduced into 37.7 grams of molten paraffin wax. After mixing, the liquid wax solution became an homogeneous blue composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

EXAMPLE 9

4.1 grams of Colorant 5 of TABLE 1 were introduced into 37.3 grams of molten paraffin wax. After mixing, the liquid wax solution became an homogeneous blue composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

EXAMPLE 10

2.4 grams of Colorant 5 of TABLE 1 and 1.3 grams of Span® 80 were introduced into 33.2 grams of molten paraffin wax. After mixing, the liquid wax solution became an homogeneous blue composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

EXAMPLE 11

5.0 grams of Colorant 6 of TABLE 1 were introduced into 37.0 grams of molten paraffin wax. After mixing, the liquid wax solution became an homogeneous blue composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

EXAMPLE 12

3.0 grams of Colorant 6 of TABLE 1 and 1.5 grams of Span® 80 were introduced into 37.0 grams of molten paraffin wax. After mixing, the liquid wax solution became an homogeneous blue composition. The liquid was then poured into a crayon mold and allowed to cool. The homogeneous liquid had little or no colorant droplets and the colorant was well dispersed within the resultant solid wax crayon. Furthermore, the crayon exhibited very good transfer to a paper writing surface.

EXAMPLE 13

1.0 gram of Colorant 5 of TABLE 1 was introduced into 300 grams of molten paraffin wax. After mixing, the liquid wax became an homogeneous blue composition. The liquid was then poured into a candle mold with a wick inserted in the middle and allowed to cool. The homogeneous liquid had little or no colorant droplets and the colorant was well dispersed within the resultant wax candle. Furthermore, after a storage time of 28 days within a polyethylene wrapper at 25° C., the colorant remained homogeneously dispersed throughout the candle. Additionally, after this storage period, no staining of the wrapper was detected thus indicating no appreciable migration of the colorant from the solid wax medium.

Introduction of Comparative Colorants into Crayon (or Candle) Compositions

Comparative non-ASA-capped colorants were prepared for comparison purposes. Comparative colorant A corresponds to Colorants 1–3 of TABLE 1, above, except the $R^1$ group is omitted and replaced with an hydrogen. Comparative colorant B corresponds to Colorants 4–6 of TABLE 1, above, except the R1 group is omitted and replaced with an hydrogen.

EXAMPLE 14 (Comparative)

2.2 grams of Comparative colorant A were introduced into 35.2 grams of molten paraffin wax. After mixing, the liquid wax solution became an heterogeneous yellow composition. The liquid was then poured into a crayon mold and allowed to cool. The heterogeneous liquid contained colorant droplets and the colorant was not well dispersed within the resultant solid wax crayon. The crayon also exhibited a poor, uneven transfer of color to a paper writing surface.

EXAMPLE 15 (Comparative)

2.6 grams of Comparative colorant A and 1.3 grams of Span® 80 were introduced into 39.2 grams of molten paraffin wax. After mixing, the liquid wax solution became an heterogeneous yellow composition. The liquid was then poured into a crayon mold and allowed to cool. The heterogeneous liquid contained colorant droplets and the colroant was not well dispersed within the resultant solid wax crayon. The crayon also exhibited a poor, uneven transfer of color to a paper writing surface.

EXAMPLE 16 (Comparative)

2.1 grams of Comparative colorant B were introduced into 32.7 grams of molten paraffin wax. After mixing, the liquid wax solution became an heterogeneous blue composition. The liquid was then poured into a crayon mold and allowed to cool. The heterogeneous liquid contained colorant droplets and the colorant was not well dispersed within the resultant solid wax crayon. The crayon also exhibited a poor, uneven transfer of color to a paper writing surface.

EXAMPLE 17 (Comparative)

2.5 grams of Comparative colorant B and 1.25 grams of Span® 80 were introduced into 38.4 grams of molten paraffin wax. After mixing, the liquid wax solution became an heterogeneous yellow composition. The liquid was then poured into a crayon mold and allowed to cool. The heterogeneous liquid contained colorant droplets and the colroant was not well dispersed within the resultant solid wax crayon. The crayon also exhibited a poor, uneven transfer of color to a paper writing surface.

EXAMPLE 18 (Comparative)

0.20 grams of a colorant corresponding to Colorants 1–3 of the TABLE, above, but with the replacement of the $R^1$ group with an hydrogen, were introduced into 900 grams of molten paraffin wax. After mixing, the liquid wax solution became an heterogeneous blue composition. The liquid was then poured into a candle mold with a wick inserted in the middle and was then allowed to cool. The homogeneous liquid had large colorant droplets and the colorants were poorly dispersed in the solid wax candle with the majority of the colorant in the bottom. Furthermore, the colorants also began migrating from the outer walls of the wax candle into its polyethylene wrapper upon contact. After a storage period of 28 days at 25° C., the wrapper was examined further and found to be thoroughly colored while the wax candle exhibited undesirable color variations throughout.

As these results indicate, the ASA-capped polyoxyalkylenated polymeric colorants provide superior performance in wax compositions than the non-ASA-capped polyoxyalkylenated polymeric colorants.

While specific features of the invention have been described, it will be understood, of course, that the invention is not limited to any particular configuration or practice since modification may well be made and other embodiments of the principals of the invention will no doubt occur to those skilled in the art to which the invention pertains. Therefore, it is contemplated by the appended claims to cover any such modifications as incorporate the features of the invention within the true meaning, spirit, and scope of such claims.

What is claimed is:

1. A wax composition comprising a wax; and a colorant defined by Formula (I)

$$R\{A[(B)_n R^1]_m\}_x \qquad (I)$$

wherein

R is an organic chromophore;

A is a linking moiety in said chromophore selected from the group consisting essentially of N, O, S, $SO_2N$, and $CO_2$;

B is selected from the group of one or more alkyleneoxy constituents containing from 2 to 4 carbon atoms;

n is an integer of from 2 to about 100;

m is 1 when A is O, S, or $CO_2$, and m is 2 when A is N or $SO_2N$;

x is an integer of from 1 to about 5; and $R^1$ is $C(O)R^2$—$CO(O)H$, wherein $R^2$ is from $C_1$ to about $C_{20}$ alkenyl.

2. The wax composition in claim 1 wherein said wax is selected from the group consisting essentially of mineral waxes, animal waxes, vegetable waxes, synthetic waxes, and any mixtures thereof.

3. The wax composition in claim 2 wherein said wax is selected from the group consisting essentially of paraffin wax, montan wax, ozokerite wax, microcrystalline wax, earth wax, beeswax, waspwax, Chinesewax (insectwax), carnauba wax, sugarcane wax, candelilla wax, flax wax, Fischer-Tropsch wax, polyethylene wax, and any mixtures thereof.

4. The wax composition in claim 3 wherein said wax is paraffin wax.

5. The wax composition in claim 1 wherein

R is selected from the group consisting essentially of azo, diazo, disazo, trisazo, diphenylmethane, triphenylmethane, xanthene, nitro, nitroso, acridine, methine, styryl, indamine, thiazole, oxazine, anthraquinone, and any mixtures thereof;

B comprises a mixture of ethyleneoxy and propyleneoxy groups;

n is from about 4 to about 30;

x is 2; and $R^2$ is from $C_{12}$ to about $C_{18}$.

6. The wax composition in claim 5 wherein

R is selected from the group consisting essentially of azo, triphenylmethane, nitro, methine, thiazole, and any mixtures thereof;

B comprises from about 0 to about 50% moles of ethyleneoxy groups and from about 50 to about 100% moles of propyleneoxy groups;

n is from about 8 to about 20; and $R^2$ is from $C_8$ to $C_{18}$.

7. The wax composition in claim 6 wherein

B comprises from about 0 to about 40% moles of ethyleneoxy groups and from about 60 to about 100% moles of propyleneoxy groups; and $R^2$ is $C_{18}$.

8. The wax composition in claim 7 wherein B comprises 100% moles of propyleneoxy groups.

9. A method of producing a colored wax article comprising the sequential steps of (a) providing a solution of molten wax;

(b) introducing into said molten wax a colorant defined by Formula (I)

    (I)

wherein

R is an organic chromophore;

A is a linking moiety in said chromophore selected from the group consisting essentially of N, O, S, $SO_2N$, and $CO_2$;

Alkyleneoxy constituent contains from 2 to 4 carbon atoms;

n is an integer of from 2 to about 100;

m is 1 when A is O, S, or $CO_2$, and m is 2 when A is N or $SO_2N$;

x is an integer of from 1 to about 5; and $R^1$ is a $C_1$ to about $C_{20}$ alkenyl succinic anhydride moiety, to produce a colored wax composition;

(c) pouring said colored wax composition into a mold; and (d) allowing sufficient time for said colored wax composition to cool within said mold.

10. The method of claim 9 wherein said wax is selected from the group consisting essentially of mineral waxes, animal waxes, vegetable waxes, synthetic waxes, and any mixtures thereof.

11. The method of claim 10 wherein said wax is selected from the group consisting essentially of paraffin wax, montan wax, ozokerite wax, microcrystalline wax, earth wax, beeswax, waspwax, Chinesewax (insectwax), carnauba wax, sugarcane wax, candelilla wax, flax wax, Fischer-Tropsch wax, and any mixtures thereof.

12. The method of claim 11 wherein said wax is paraffin wax.

13. The method of claim 9 wherein

R is selected from the group consisting essentially of azo, diazo, disazo, trisazo, diphenylmethane, triphenylmethane, xanthene, nitro, nitroso, acridine, methine, styryl, indamine, thiazole, oxazine, anthraquinone, and any mixtures thereof; and B comprises a mixture of ethyleneoxy and propyleneoxy groups;

n is from about 4 to about 30;

x is 2; and $R^2$ is from $C_8$ to $C_{18}$.

14. The method of claim 13 wherein

R is selected from the group consisting essentially of azo, triphenylmethane, nitro, thiazole, and any mixtures thereof; and B comprises from about 0 to about 50% moles of ethyleneoxy groups and from about 50 to about 100% propyleneoxy groups.

15. The method of claim 14 wherein

B comprises from about 0 to about 40% moles of ethyleneoxy groups and from about 60 to about 100% moles of propyleneoxy groups;

n is from about 8 to about 20; and $R^2$ is from $C_{12}$ to $C_{18}$.

16. The method of claim 15 wherein

B comprises 100% moles of propyleneoxy groups; and $R^2$ is $C_{18}$.

17. The method of claim 14 wherein said article is a crayon.

18. The method of claim 14 wherein said article is a candle.

19. The method of claim 9 wherein said article is a crayon.

20. The method of claim 9 wherein said article is a candle.

* * * * *